(12) United States Patent
Lubker, II et al.

(10) Patent No.: US 6,263,574 B1
(45) Date of Patent: Jul. 24, 2001

(54) METHODS FOR USING A SUPPORT BACKER BOARD SYSTEM FOR SIDING

(75) Inventors: John W. Lubker, II, Roswell; Gregg A. Hebert, Conyers, both of GA (US)

(73) Assignee: Tenneco Packaging Inc., Lake Forest, IL (US)

( * ) Notice: Subject to any disclaimer, the term of this patent is extended or adjusted under 35 U.S.C. 154(b) by 0 days.

(21) Appl. No.: 09/261,286

(22) Filed: Mar. 2, 1999

(51) Int. Cl.[7] ........................................ B21D 47/00
(52) U.S. Cl. ...................... 29/897.32; 29/419.1; 52/309.8
(58) Field of Search .................. 29/419.1, 897.32, 29/897.33; 428/458, 457, 461; 52/309.8

(56) References Cited

U.S. PATENT DOCUMENTS

| | | | |
|---|---|---|---|
| 1,615,801 | * | 1/1927 | Elmendorf . |
| 2,033,752 | * | 3/1936 | Billingham . |
| 2,158,908 | * | 5/1939 | Ottinger . |
| 3,024,496 | * | 3/1962 | Colombo . |
| 3,281,516 | * | 10/1966 | Southwick . |
| 3,776,672 | * | 12/1973 | Heilmayr . |
| 3,826,054 | * | 7/1974 | Culpepper, Jr. . |
| 3,899,561 | * | 8/1975 | Heilmayr . |
| 4,037,006 | * | 7/1977 | Roberts et al. . |
| 4,506,486 | | 3/1985 | Culpepper, Jr. et al. ............... 52/529 |
| 4,642,950 | * | 2/1987 | Kelly . |
| 4,786,350 | * | 11/1988 | Nesbitt et al. . |
| 4,788,808 | * | 12/1988 | Slocom . |
| 4,908,403 | * | 3/1990 | Spada et al. . |
| 4,974,382 | * | 12/1990 | Avellanet . |
| 5,111,579 | * | 5/1992 | Andersen . |
| 5,170,603 | * | 12/1992 | Bartlett . |
| 5,201,981 | * | 4/1993 | Whiteside . |
| 5,345,738 | * | 9/1994 | Dimakis . |
| 5,662,977 | * | 9/1997 | Spain et al. . |
| 5,695,870 | | 12/1997 | Kelch et al. ...................... 428/318.4 |
| 5,720,915 | * | 2/1998 | Joppen et al. . |
| 5,759,670 | * | 6/1998 | Bussey, Jr. et al. . |
| 6,067,770 | * | 5/2000 | Lubker et al. . |

OTHER PUBLICATIONS

Brochure entitled "*Astro–Foil™ For The H.V.A.C. Industry*," Astro–Foil™ Reflective Insulation, 2 pages (no date).
Brochure entitled "*Astro–Foil™ Reflective Insulation*," Astro–Valcour, Incorporated, 6 pages (1990).
Brochure entitled *Astro–Foil™ And Astro–E Installation Guidelines*, Astro–Valcour, Incorporated, 6 pages (Dec. 1989).
Brochure entitled "*Carpenter Sheathing*," Carpenter Insulation Company, 2 pages (no date).
Brochure entitled "*Styrofoil® High Efficiency Insulating Sheathing*," and "*Carpenter Polyisocyanurate Sheathing*," Carpenter Insulation Company, 2 pages (no date).
Brochure entitled "*Celotex® Super Tuff–R® Insulating Sheathing*," Celotex Corporation, 4 pages (Apr. 1998).
Brochure entitled "*Value–R™ Insulation Board*," Celotex Corporation, 8 pages (Jun. 1996).

(List continued on next page.)

*Primary Examiner*—S. Thomas Hughes
*Assistant Examiner*—Steven Blount
(74) *Attorney, Agent, or Firm*—Jenkens & Gilchrist

(57) ABSTRACT

A method for using a support backer board system and siding. The support backer board system comprises at least a first layer. The first layer is made from a material selected from the group consisting of alkenyl aromatic polymers, polyolefins, polyethylene terephthalate, polyesters, and combinations thereof. The board system is thermoformed into a desired shape with the desired shape being generally contour to the selected siding. The siding is attached to the board system so as to provide support thereto. In one process, the siding may be vinyl.

28 Claims, 6 Drawing Sheets

OTHER PUBLICATIONS

Brochure entitled "Thermax® Sheathing," Celotex Corporation, 12 pages (Jan. 1996).
Brochure entitled "Thermax® Heavy Duty (HD) Insulation/Finish Board," Celotex Corporation, 4 pages (Aug. 1995).
Brochure entitled "Thermax® Heavy Duty Plus (HDP) Insulation/Finish Board," Celotex Corporation, 4 pages (Dec. 1995).
Brochure entitled "Thermax® AG–Therm™ Insulation/Finish Board," Celotex Corporation, 8 pages (Dec. 1996).
Brochure entitled "Tuff–R® Insulating Sheathing," Celotex Corporation, 16 pages (Aug. 1991).
Brochure entitled "Tuff–R® Insulating Sheathing (Nonreflective)," Celotex Corporation, 2 pages (no date).
Brochure entitled "Denny Building Products," Denny Building Products, 8 pages (no date).
Brochure entitled "Dennyfold Insulating Underlayment Board," Denny Building Products, 2 pages (no date).
Brochure entitled "Dennyfold Underlayment Board," Denny Products, 2 pages (no date).
Brochure entitled "Styrofoam Duramate," Dow Chemical Company, 2 pages (no date).
Brochure entitled "Styrofoam Duramate," Dow Chemical Company, 2 pages (no date).
Brochure entitled "The Ad–Building Program For Re–Siders," Dow Chemical Company, 7 pages (no date).
Brochure entitled "Styrofoam," Dow U.S.A., 8 pages (no date).
Brochure entitled "Low–E Insulation," Environmentally Safe Products, Inc., 6 pages (1996).
Brochure entitled "Low–E Insulation Data & Installation Guidelines," Environmentally Safe Products, Inc., 28 pages, (no date).
Brochure entitled "Low–E™ Insulation," Environmentally Safe Products Inc., 6 pages (no date).
Brochure entitled "New ThermoWall," Expanded Plastics, Inc., 4 pages (no date).
Brochure entitled "Dura–Foam®," Foam Plastics of New England, 8 pages (no date).
Brochure entitled "Insul–Wrap," Foam Plastics of New England, 2 pages (no date).
Brochure entitled "Insul–Wrap™," Foam Plastics of New England, 2 pages (no date).
Brochure entitled "Astro–Foil™ Reflective Insulation," Innovative Energy, Inc., 4 pages (May 1996).
Brochure entitled "Astro–E™ Reflective Insulating Material," Innovative Energy, Inc., 1 page (no date).
Brochure entitled "Fome–Cor® Board," Monsanto Company, 1 page (1990).
Brochure entitled "Fome–Cor Sheathing Board," Monsanto Company, 1 page (1982).
Brochure entitled "Homeowners' Underlayment Assurance Policy," Monsanto Company, 2 pages (1991).
Brochure entitled "How Fome–Cor® Foils The Competition," Monsanto Company, 2 pages (1990).
Brochure entitled "Fome–Cor® Has The Secret That Minimizes Dry Rot," Monsanto Company, 2 pages (1989).
Brochure entitled "Fome–Cor® Sheathing Board," Monsanto Company, 8 pages (1984).
Brochure entitled "Weather Barrier Fome–Cor® Board Technical Manual," Monsanto Engineered Products Division, 21 pages (1986).
Brochure entitled "Energy–Efficient Building Products," NRG Barriers, 8 pages (no date).

Brochure entitled "ProPink™ SuperTough Insulating Sheathing," Owens Corning, 2 pages (Mar. 1997).
Brochure entitled "Fanfold Extruded Polystyrene Insulation For Residing And Other Applications," Owens Corning, 2 pages (Jun. 1996).
Brochure entitled "Perma 'R'," Perma "R" Products, Inc., 4 pages (no date).
Brochure entitled "Perma 'R' Plus," Perma R Products, inc., 1 page (no date).
Brochure entitled "Ply–Foil Reflective Insulation Specification & Application Guide For Post Frame And Metal Building Construction," Ply–Foil Incorporated, 12 pages, (no date).
Brochure entitled "Gold Series Insulation Products," Plymouth Foam Products, 4 pages (no date).
Brochure entitled "Flexfoil™ Reflective Insulation," Polyair Insulation, 2 pages (no date).
Brochure entitled "Flexfoil™ 'Low–E' Reflective Insulation," Polyair Insulation, 9 pages (no date).
Brochure entitled "Insulfoam," Premier Industries Inc., 2 pages (no date).
Brochure entitled "Reflectix™ Insulation Installation Guide & Ideas," Reflectix, Inc., 9 pages (Dec. 1994).
Brochure entitled "Siding," RSI—State of Industry, 2 pages, S27 (Dec. 1996).
Brochure entitled "Shelterwrap Air Infiltration," Shelter Enterprises Incorporated, 3 pages (no date).
Brochure entitled "SheathAll HD," Shelter Enterprises, Inc., 2 pages (no date).
Brochure entitled "Shelterwrap HD.™ The Better Leveler," Shelter Enterprises Incorporated, 2 pages (no date).
Brochure entitled "Superwrap," Shelter Enterprises, Inc., 2 pages (no date).
Brochure entitled "Shelterfoam Snap Vents," Shelter Enterprises Incorporated, 1 page (no date).
Brochure entitled "AMOCOR®–PB6 Roofing Recovery Board," Tenneco Building Products, 2 pages (Apr. 1998).
Brochure entitled "AMOCOR® PLYGOOD® New Construction Sheathing," Tenneco Building Products, 2 pages (Feb. 1998).
Brochure entitled "AMOCOR®–PB4 Waterproofing Protection Board," Tenneco Building Products, 2 pages (Dec. 1997).
Brochure entitled "AMOCOR® Residing Underlayment," Tenneco Building Products, 4 pages (no date).
Brochure entitled "AMOCOR® Fanfold Underlayments," Tenneco Building Products, 6 pages (Apr. 1998).
Brochure entitled "AMOCOR® PLYFOLD™ Residing Underlayment," Tenneco Building Products, 2 pages (no date).
Brochure entitled "Underlayment Board," UC Industries, Inc., 2 pages (Jul. 1991).
Brochure entitled "The Insulator™," Unlimited Quality Products, 7 pages (Feb. 1997).
Brochure entitled "Thermowall," VIPCO, 4 pages (no date).
Brochure entitled "Thermowall," author unknown, 1 page (no date).
Brochure entitled "P–2000' Reflect–Sulation," author unknown, 4 pages (no date).
Brochure entitled "A Building Is Only As Good As It's Foundation," author unknown, 9 pages (no dated).
Article (partial) entitled "L–P Starts Over With Smart Siding," Environmental Building News, vol. 6, No. 7, p. 7 (Jul./Aug. 1997).

Kozul–Naumovski, Zlata, "How To Choose Vinyl Siding," Professional Remodeler, pp. cover, 61–65 (May/Jun. 1997).

Leddy, Robert, "The Art Of Installing Vinyl Siding," RSI, pp. 36, 38, 40 (May 1998).

Wilson, Alex, et al., "Residential Siding Options," Environmental Building News, vol. 6, No. 7, pp. unmarked, 12–18 (Jul./Aug. 1997).

* cited by examiner

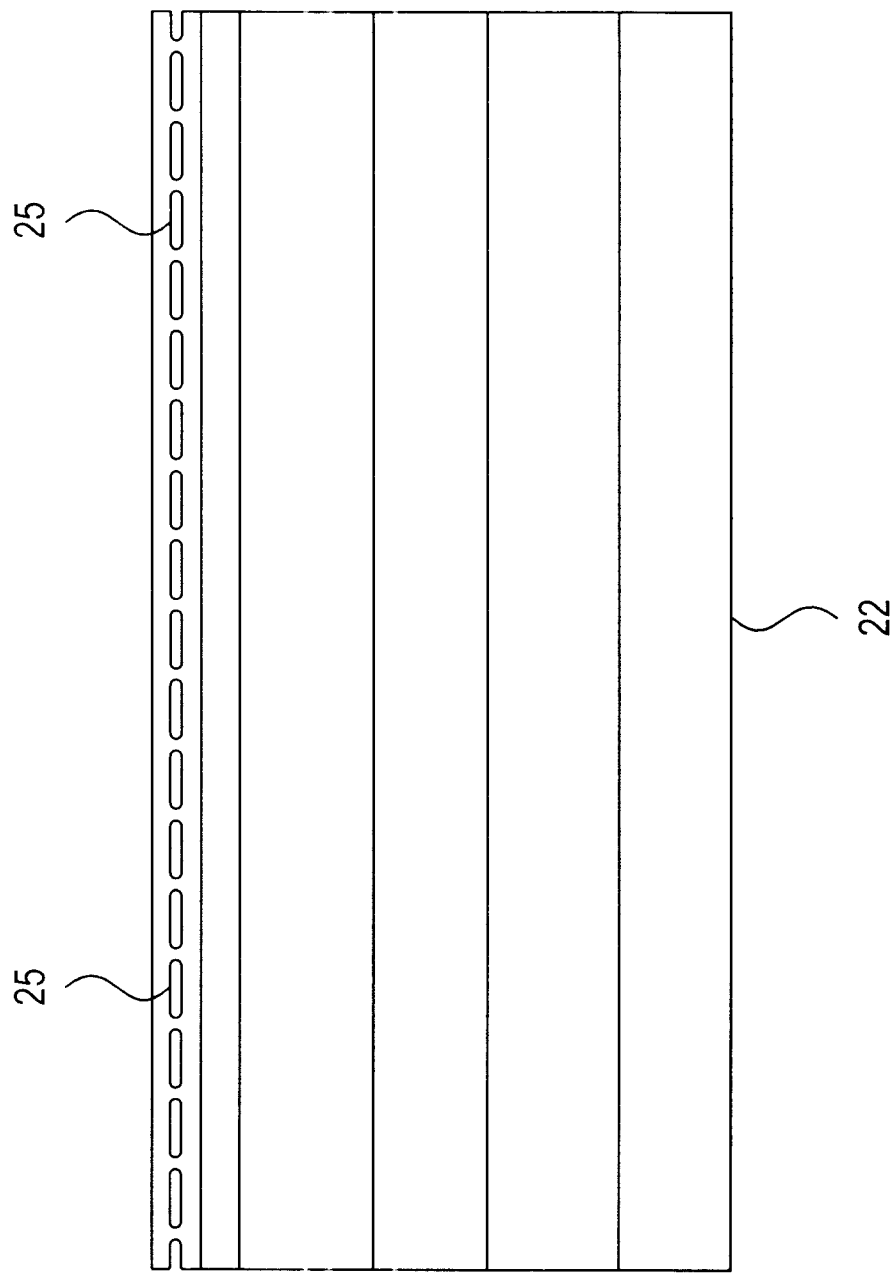

METHODS FOR USING A SUPPORT BACKER BOARD SYSTEM FOR SIDING

FIELD OF THE INVENTION

The present invention is directed to methods for using a support backer board system in siding applications. In particular, the present invention is directed to methods for using a backer board system that provides support to siding, such as vinyl siding.

BACKGROUND OF THE INVENTION

The application of siding to various structures has been known for many years. Siding may be used in new construction in both residential and commercial structures, as well as in remodeling of those structures (also referred to as "retrofitting"). The siding may be made from different materials, such as vinyl, aluminum, steel, softwood, wood composites, and hardwood. To reduce costs, vinyl siding has generally become more lightweight or flimsier as compared to its inception. This vinyl siding is, thus, more susceptible to being deformed, breaking, and/or having a wavy appearance that is generally not aesthetically pleasing to a customer. For example, vinyl siding may be deformed or bowed (also referred to as "cupping").

Backer boards have been used in connection with vinyl siding. For example, beadboard (expanded polystyrene foam or EPS foam) has been used with vinyl siding. Beadboard, however, has disadvantages, such as being susceptible to breaking during or before installation, as well as being labor intensive during installation.

At least one type of beadboard is molded into shapes by steam heating so as to conform to individual siding designs. The molded beadboard is formed in narrow pieces of varying lengths. These narrow pieces may be glued by the manufacturer or may be dropped in behind the siding by the installer. The installation of narrow beadboard pieces results in more opportunities for air leakage between adjacent pieces.

Another backer board that has been used with vinyl siding involves using a plurality of foam profile strips that are intermittently located behind the siding. Each foam profile strip is generally flat with a double-sided adhesive strip attached thereto in which each strip is adapted to attach to a portion of a back side of the vinyl siding. The use of foam profile strips has disadvantages, such as being labor intensive to install, while not providing the desired support.

Accordingly, a need exists for a backer board system that avoids the above-described problems, while providing support to the siding application.

SUMMARY OF THE INVENTION

According to one method of the present invention, a support backer board system and siding are used. The support backer board system comprises at least a first layer. The first layer is extruded and made from a material selected from the group consisting of alkenyl aromatic polymers, polyolefins, polyethylene terephthalate, polyesters, and combinations thereof. The board system is thermoformed into a desired shape that is generally contour to the selected siding. Siding is provided and attached to the board system so as to provide support thereto.

BRIEF DESCRIPTION OF THE DRAWINGS

Other objects and advantages of the invention will become apparent upon reading the following detailed description and upon reference to the drawings.

FIG. 4b is a side view of a portion of the siding system of FIG. 4a.

FIG. 5 is a front view of siding according to one embodiment.

Figure 1:
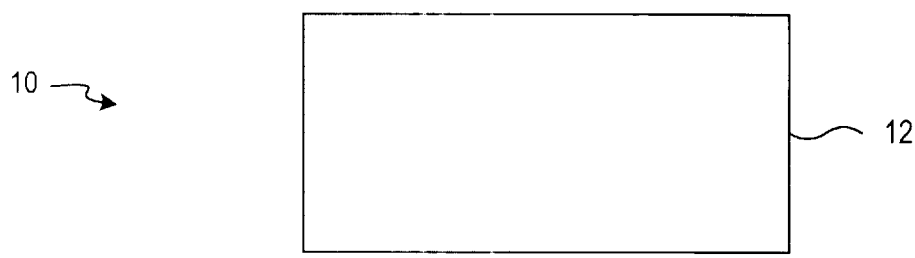
FIG. 1 is a side view of the support backer board according to one embodiment used in the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DESCRIPTION OF ILLUSTRATIVE EMBODIMENTS

Support Backer Board System

Figure 2:
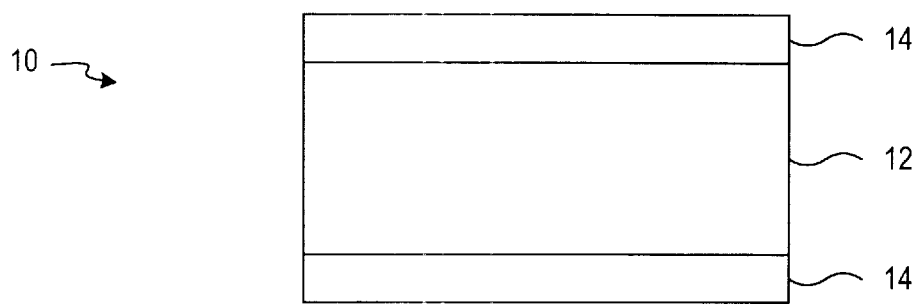
FIG. 2 is a side view of the support backer board according to another embodiment used in the present invention.
Figure 3:
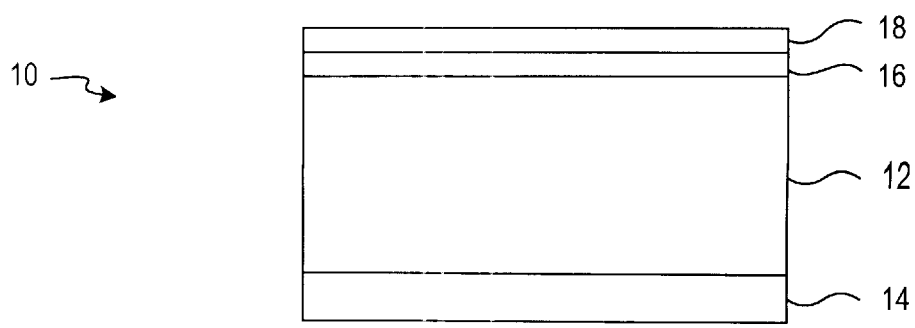
FIG. 3 is a side view of the support backer board according to yet another embodiment used in the present invention.

According to one embodiment of the present invention, support backer board system 10 is shown in FIG. 1 as including first layer 12. According to another embodiment, support backer board system 10 is shown in FIG. 2 as including first layer 12 located between second layer 14 and another second layer 14. Additional layers may be added to support backer board system 10 to bond any of the adjacent layers together. For example, FIG. 3 shows an alternative embodiment where support backer board 10 includes first layer 12 located between second layer 14 and third layer 16 and fourth layer 18 located adjacent to third layer 16. Third layer 16 is an adhesive layer in FIG. 3.

Figure 4A:
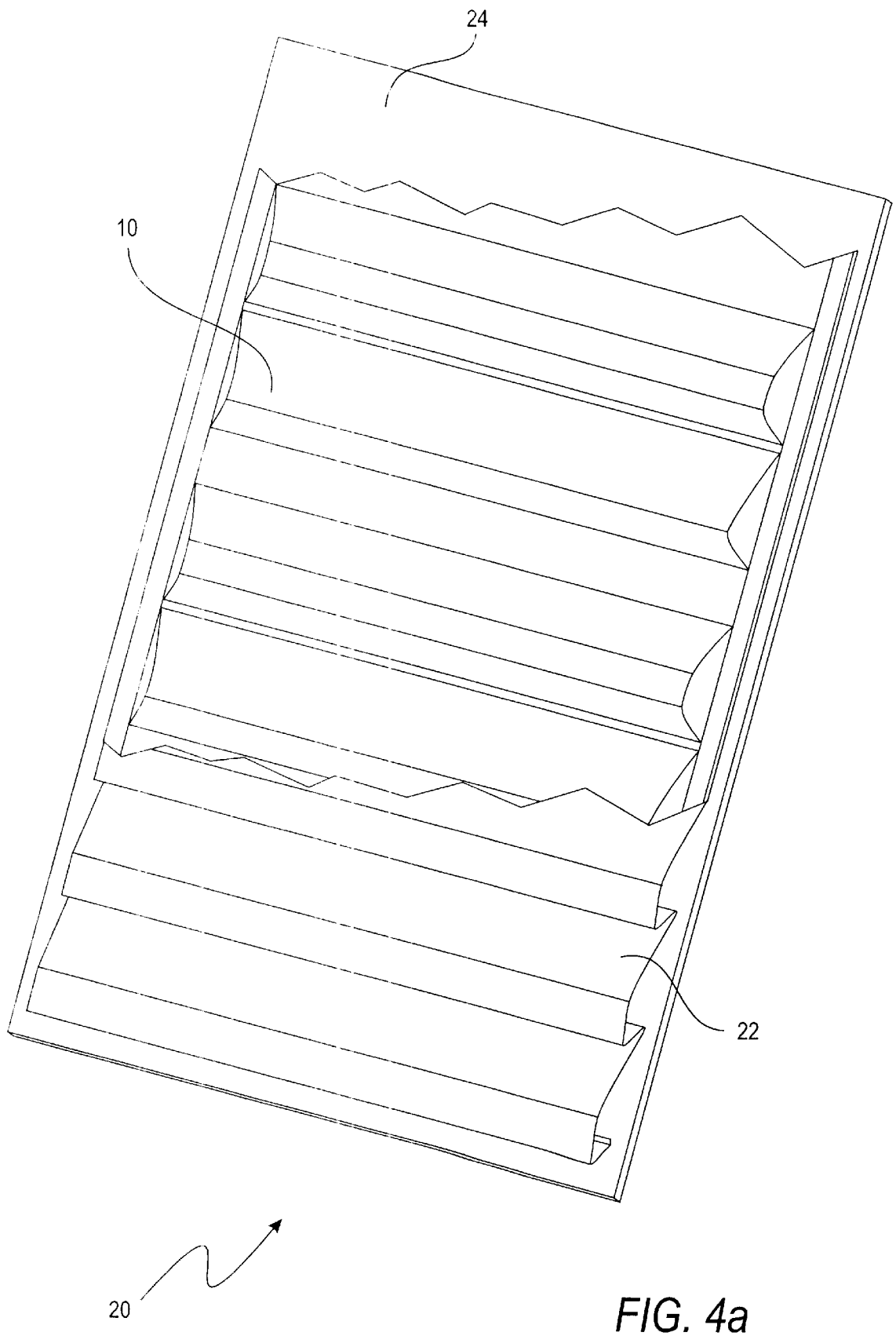
FIG. 4a is a perspective view of a siding system that has been cut away using the support backer board of FIG. 1 in the present invention.
Figure 4B:
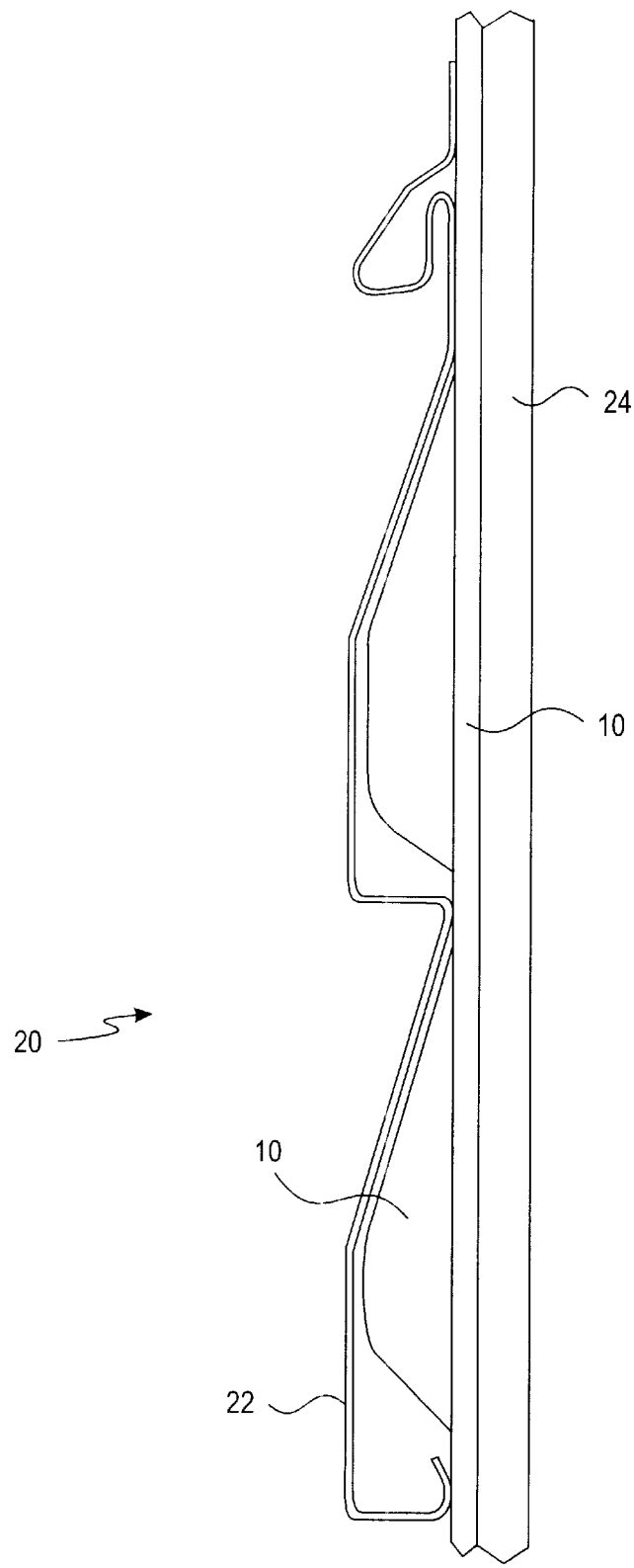

FIG. 4a illustrates a perspective view of a siding system according to one embodiment that has been cut away using the support backer board of FIG. 1. FIG. 4b illustrates a side view of a portion of FIG. 4a. Siding system 20 of FIGS. 4a and 4b includes support backer board system 10, siding 22, and plywood 24. Support backer board system 10 of FIGS. 4a and 4b is located on an interior surface of siding 22, while plywood 24 is located on an interior surface of support backer board system 10. FIG. 5 depicts a front view of the siding according to one embodiment that includes a plurality of holes or slots 25.

First Layer

Referring to FIGS. 1–3, first layer 12 of support backer board system 10 may be independently formed from any of the following resins: alkenyl aromatic polymers, polyolefins, polyethylene terephthalate (PET), polyesters, and combinations thereof. First layer 12 is, generally from about 125–500 mils in thickness, with a preferred thickness from about 250–375 mils.

The term "alkenyl aromatic polymer," as used herein, includes polymers of aromatic hydrocarbon molecules which contain an aryl group joined to an olefinic group with only double bonds in the linear structure, such as styrene, α-methylstyrene, o-methylstyrene, m-methylstyrene, p-methylstyrene, α-ethylstyrene, α-vinylxylene, α-chlorostyrene, α-bromostyrene, vinyl toluene, and the like. Alkenyl aromatic polymers also include homopolymers of styrene (commonly referred to as "polystyrene" or "polystyrenic resin") and also copolymers of styrene and butadiene (commonly referred to as "impact polystyrene").

The terms "polystyrenic resin" or "polystyrene," as used herein, include homopolymers of styrene and styrene copolymers comprised of at least 50 mole percent of a styrene unit (preferably at least about 70 mole percent) and a minor (i.e., less than 50%) proportion of a monomer copolymerizable with styrene. The terms "polystyrenic resin" or "polystyrene," as used herein, also include blends of at least 50 wt. % of the styrene homopolymer (preferably at least about 60 wt. %) with another predominately styrenic copolymer. The physical blends are combined in a dry form after the blends have previously been polymerized.

The polystyrenic resin used in the present invention may be any of those homopolymers obtained by polymerizing styrene to a weight average molecular weight (Mw) of from about 100,000–450,000 (commonly referred to as "crystal polystyrene"), or any of those graft copolymers obtained by polymerizing a blend of polymerized styrene upon a nucleus of styrene butadiene rubber (SBR) to a weight average molecular weight of from about 100,000–350,000 (commonly referred to as "impact polystyrene").

Impact polystyrenes are generally classified as medium impact polystyrene (MIPS), high impact polystyrene (HIPS), or super high impact polystyrene (S-HIPS). The butadiene level of the impact polystyrene is preferably in the range from about 3–10 wt. % of the copolymer (butadiene and polystyrene). The impact polystyrene generally has a melt flow index of less than about 5 g/10 min., and preferably less than about 3 g/10 min.

The alkenyl aromatic polymer used in the present invention may be obtained by blending two or more alkenyl aromatic polymers. For example, blends of crystal polystyrene and impact polystyrenes, such as crystal polystyrene and HIPS, may be blended to comprise the alkenyl aromatic polymer.

The term "polyolefin," as used herein, includes polypropylenes, polyethylenes, and polybutenes. The term "polypropylene," as used herein, includes polymers of propylene or polymerizing propylene with other aliphatic polyolefins, such as ethylene, 1-butene, 1-pentene, 3-methyl-1-butene, 4-methyl-1-pentene, 4-methyl-1hexene, 5-methyl-1-hexene, and mixtures thereof. Polypropylene not only includes to homopolymers of propylene, but also propylene copolymers comprised of at least 50 mole percent (preferably at least 70 mole percent) of a propylene unit and a minor proportion of a monomer copolymerizable with propylene and blends of at least 50 wt. % of the propylene homopolymer with another polymer.

The term "polyethylene," as used herein, includes polymers of ethylene, such as low density polyethylene (LDPE), medium density polyethylene (MDPE), high density polyethylene (HDPE), very low density polyethylene (VLDPE), linear low density polyethylene (LLDPE), metallocene-catalyzed linear low density polyethylene (mLLDPE), and combinations thereof.

LDPE is generally defined as an ethylenic polymer having a specific gravity of from about 910–925 kg/m³. MDPE is generally defined as an ethylenic polymer having a specific gravity between the LDPEs and the HDPEs (i.e., from about 925–940 kg/m³). The term polyethylene, as used herein, includes homopolymers of ethylene and copolymers comprised of at least 50 mole percent of an ethylene unit (preferably at least 70 mole percent) and a minor (i.e., less than 50%) proportion of a monomer copolymerizable with the ethylene unit. The term LDPE, as used herein, also includes physical blends of two or more different homopolymers that are classified as LDPEs. Similarly, the term MDPE and HDPE may also include blends of two or more different homopolymers classified as MDPEs and HDPEs, respectively.

HDPE used in the present invention generally has a specific gravity of from about 940–970 kg/m³. The $M_z$ is generally greater than about 1,000,000 and may be greater than about 1,200,000. The z-average molecular weight ($M_z$) is characterized by a concentration of extremely high molecular Weight polymer chains (i.e., those near an upper end of the molecular weight distribution). The HDPE generally has a polydispersity index, $D=M_w/M_n$, in the range of from about 12–20.

VLDPE used in the present invention generaly has a density from about 880–912 kg/m³, more commonly from about 890–910 kg/m³, and a melt index of from about 0.5–5 g/10 min., preferably from about 1–3 g/10 mn.

LLDPE used in the present invention generally has from about 1–20 wt. %, and preferably from about 1–10 wt. %, of higher alpha olefin monomer copolymerized therein. In addition, the alpha olefin monomer employed in the ethylenic copolymer may be selected from the group consisting of 1-butene, 3-methyl-1-butene, 3-methyl-1-pentene, 1-hexene, 4-methyl-1-pentene, 3-methyl-1-hexene, 1-octene, and 1-decene. The LLDPE resins that may be used in the present invention have densities from about 890–940 kg/m³, more commonly from about 900–930 kg/m³, and melt indices ($I_2$) of from about 1–10 g/10 min. as determined by ASTM D1238.

The mLLDPE is a polymer having a low polydispersity. The low polydispersity polymer may be prepared from a partially crystalline polyethylene resin that is a polymer prepared with ethylene and at least one alpha olefin monomer (e.g., a copolymer or terpolymer). The alpha olefin monomer generally has from about 3–12 carbon atoms, preferably from about 4–10 carbon atoms, and more preferably from about 6–8 carbon atoms. The alpha olefin comonomer content is generally below about 30 wt. %, preferably below about 20 wt. %, and more preferably from about 1–15 wt. %. Exemplary comonomers include propylene, 1-butene, 1-pentene, 1-hexene, 3-methyl-1-pentene, 4-methyl-1-pentene, 1-octene, 1-decene, and 1-dodecene.

The low polydispersity polymer has a density of from about 880–940 kg/m³. The polydispersity polymer should have a molecular weight distribution, or polydispersity, ($M_w/M_n$, "MWD") within the range of from about 1–4, preferably from about 1.5–4, more preferably from about 2–4, and even more preferably from about 2–3. The melt flow ratio (MFR) of these polymers, defined as $I_{20}/I_2$ and as determined in accordance with ASTM D1238, is generally from about 12–22, with preferably lower and higher limits of about 14–20, respectively. The melt index (MI), defined as the $I_2$ value, should be in the range of from about 0.5–10 g/10 min., and preferably with lower and upper limits of about 1–5 g/10 min., respectively, as determined by ASTM D1238.

An example of a "polybutene" includes a polymer of isobutene. An example of a "polyethylene terephthalate"

includes a polyester resin made from ethylene glycol and terephthalic acid. An example of a "polyester" includes a polyester resin which is a polycondensation product of a dicarboxylic acid with a dihydroxy alcohol.

According to a preferred embodiment, first layer 12 of support backer board system 10 is formed by extruding an alkenyl aromatic polymer, such as a polystyrenic resin. Polystyrenic resins are generally preferred because they provide more stiffness to support backer board system 10 than other materials, such as polyethylene as measured by ASTM D1037-87 and ASTM D1621-73. Also, at the present time, polystyrenic resins are more economical to use than other contemplated resins for forming first layer 12. A preferred polystyrenic resin for use in first layer 12 is a blend of impact polystyrene and crystal polystyrene. The blend of impact polystyrene and crystal polystyrene may include virgin and reprocessed or reclaimed material.

Second And Fourth Layers

Optional second layers 14 and 18 of support backer board system 10 may be independently formed from any of the following resins: alkenyl aromatic polymers, polyolefins, polyethylene terephthalate (PET), polyesters, and combinations thereof. Second layer 14 and fourth layer 18 are generally each from about 0.5–3.0 mils in thickness, and more specifically from about 0.8–2.0 mils.

According to one embodiment, at least one of second layer 14 and fourth layer 18 of support backer board system 10 are formed from alkenyl aromatic polymers. At the present time, polystyrenic resins are more economical to use than other contemplated resins for forming second and fourth layers 12, 16. The preferred polystyrenic resin is impact polystyrene and, more specifically, high impact polystyrene.

According to another embodiment, at least one of second layer 14 and fourth layer 18 are film layers. Second layer 14 and fourth layer 18 may be metallized or foil. Second layer 14 and fourth layer 18 may be single or biaxially orientated. A polystyrene-based film that may be used is DOW TRYCITE®. The preferred film layer is formed from a polyolefin. A preferred polyolefin for use in forming second layer 14 and fourth layer 18 is polypropylene. The polyolefin film used in forming second layer 14 and fourth layer 18 generally has an ultimate tensile as measured by ASTM D882 of greater than about 3700 psi, and a percent elongation as measured by ASTM D882 of greater than about 450%.

Third Layer

Third layer 16 of support backer board system 10 may be formed from any of the following resins: alkenyl aromatic polymers, polyolefins, polyethylene terephthalate, polyesters, adhesives, and combinations thereof The term "adhesive," as used herein, includes any material which is capable of chemically bonding one layer of support backer board system 10 to another layer. Examples of suitable adhesives include ethylene vinyl acetate (EVA), a mixture of EVA in polyethylene, block copolymers comprising polymeric regions of styrenerubber-styrene, such as KRATON® made by SHELL® Chemical Company, and a mpdified EVA, such as BYNEL® made by DuPONT®. Modified EVAs generally hbve melt indices from about 6.4–25 g/10 min. as measured by ASTM D1238, and densities from about 923–947 kg/m³ as measured by ASTM D1505. The adhesive miy be a mixture of EVA in polyethylene, with the preferred amount being at least 15% EVA in polyethylene. Preferred adhesives for third layer 16 are KRATON® and BYNEL®, as described above.

If third layer 16 is not an adhesive, it is generally from about 0.8–3.0 mils in thickness, with the preferred thickness being from about 0.8–2.0 mils. If third layer 16 is an adhesive, the thickness of third layer 16 is generally from about 0.15–0.5 mils in thickness.

Additional Layers

It is contemplated that additional layers may be used in support backer board system 10. For example, support backer board system 10 of FIGS. 1–3 may contain optional laminated surface coatings or "facers." The optional facers provide additional durability and bendability to support backer board system 10. The optional facers may be a metallized film or foil. The optional facers may be added to an existing outer layer(s), such as to the outer surfaces of second layers 14 of FIG. 2. To enhance the R-value, a reflective facer may be used if there exists an air space between the layers. The facers will generally have a reflectivity greater than 90%. Support backer board system 10 may also include additional layers, as described above, with respect to first layer 12, second layer 14, third layer 16, and fourth layer 18.

Support Backer Board System

The individual layers of support backer board system 10 may be bonded by attaching, adhering, fusing, or the like. For example, the layers may be thermally or chemically bonded to one another. Whether a layer is thermally or chemically bonded depends upon the selected resin(s) of one layer and that of the adjacent layer. Thermal bonding may be accomplished by any conventional manner to fuse the polymeric surfaces, including use of a flameless air torch, heated rolls, and infrared heating.

Chemical bonding may be accomplished by using a chemical attaching means, such as an adhesive. Optionally, an additional layer or layers may be added to support backer board system 10 between any of the adjacent layers to chemically bond the adjacent layers. For example, an adhesive may be used between first layer 12 and second layer 14. Likewise, a second adhesive may be used between any of the remaining layers to bond the layers to one another. It is also contemplated that one or more adhesives may be preattached to a layer, coextruded onto a layer, or applied via conventional adhesive bonding methods.

Referring to FIG. 4a, siding system 20 includes support backer board system 10 siding 22, and plywood 24. It is contemplated that plywood 24 may be replaced by another material, such as orientated strand board (OSB), other foamed sheathings (such as extruded polystyrene, polyisocyanurate (also referred to as "isoboard")), beadboard, hardboard, blackboard, fiberboard, or existing siding. Siding system 20 is typically attached to an installation board, such as a 2×4 ft. board (not shown). As shown in siding system 20 of FIGS. 4a and 4b, support backer board system 10 is located on an interior surface of siding 22 and an outer surface of plywood 24. Support backer board system 10 may be attached to siding 22 by a variety of methods, such as being attached mechanically by fasteners, such as nails, screws, staples, and the like. Support backer board 10 may also be adhered chemically by adhesives and the like to siding 22. In one type of siding 22 shown in FIG. 5, a plurality of holes 25 are informed therein to assist in attaching siding 22 and support backer board system 10. Typically, the attachment of siding 22 and support backer board system 10 occurs at essentially the same time as the attachment of support backer board system 10 and plywood 24. Of course, support backer board system 10 may be separately attached to siding 22 and plywood 24.

The support backer board system maybe used with siding in both commercial and residential structures. Additionally, the support backer board system may be used in new construction and in remodeling or retrofitting of existing construction.

It is contemplated that the support backer board system may be used on siding systems other than shown in FIGS. 4a and 4b.

Properties Of The Support Backer Board System

Support backer board system 10 used in the present invention comprises at least first layer 12. It is preferable that at least one layer of support backer board system 10 be an alkenyl aromatic polymer (e.g., a polystyrene), due to economical considerations.

Support backer board system 10 having a first layer made of a foamed material generally has a density as measured by ASTM D1622-88 from about 1.0–6.0 lbs/ft$^3$, with preferred lower and upper limits of about 2.0–5.0 lbs/ft$^3$, respectively. The optional second and fourth layers, if a solid layer (i.e., a non-foamed layer), generally have a density of from about 54.0–69.0 lbs/ft$^3$. The optional third layer, if a solid layer, generally has a density of from about 54.0–69.0 lbs/ft$^3$.

Support backer board system 10 used in the present invention provides support to the siding, and exhibits good stiffness and strength in the machine direction as measured by ASTM D1037-87. Support backer board system 10 generally has a machine direction (MD) average flexural strength stress at yield of greater than about 200 psi as determined by ASTM D1037-87. The MD average flexural strength stress at yield is preferably greater than about 225 psi, most preferably is greater than about 250 psi, and even more preferably is greater than 275 psi. Support backer board system 10 generally has a transverse direction (TD) average flexural strength stress at yield of greater than about 130 psi as determined by ASTM D1037-87. The TD average flexural strength stress at yield is preferably greater than about 150 psi, most preferably is greater than about 170 psi, and even more preferably is greater than 190 psi.

Support backer board system 10 generally has an MD average load at yield greater than about 2.5 lbs as determined by ASTM D1037-87. The MD average load at yield is preferably greater than about 2.75 lbs, more preferably is greater than about 3.0 lbs, and most preferably is greater than about 3.25 lbs. Support backer board system 10 generally has a TD average load at yield greater than about 1.5 lbs as determined by ASTM D1037-87. The TD average load at yield is preferably greater tan about 1.75 lbs, more preferably is greater than about 2.0 lbs, and most preferably is greater than about 2.25 lbs.

Support backer board system 10 generally has an MD average compressive strength at 10% deflection of greater than about 10 psi as determined by ASTM D1621-73. The MD average compressive strength at 10% deflection is preferably greater than about 12 psi, and most preferably is greater than about 18 psi.

Support backer board system 10 that is perforated generally has a water vapor transmission rate (WVTR) of greater than 1.0, and preferably greater than 1.8 as determined by ASTM E96 (Procedure A). A perforated board is typically used in remodeling where a warm side vapor barrier is not present. For a support backer board system in new construction (without perforations), the WVTR is less than 1.0, and preferably less than about 0.8 as determined by ASTM E96 (Procedure A).

Support backer board system 10 used in the present invention may be formed into a number of shapes. For example, support backer board system 10 may be a board sheet or a folded or hinged board (commonly referred to as "fanfold board"). The fanfold board is designed to unfold at its hinges and includes a number of in dividuals panels. A preferred shape is a fanfold board because it reduces labor costs by having additional coverage per unit. This saves time in transporting the materials to the site and during installation. Additionally, fanfolded boards also reduce the possibility of spaces forming during the installation of adjacent support backer board systems as compared to board sheets since fanfolded boards typically cover a large surface area of the siding.

Support backer board system 10 used in the present invention may be manufactured in a variety of sizes. Popular sizes used in new construction or remodeling siding applications include 2'×8' (2 feet×8 feet), 4'×8', and 4'xx 9' beard sheets. Popular fanfold sizes include 4'×24' and 4'×50', which include a number of individual panels for easy installation and labor savings.

Support backer board system 10 may also vary in thickness depending on the selected materials. If a foamed alkenyl aromatic polymer is used, the thickness of support backer board system 10 is generally from about 125–500 mils as measured by ASTM D1622-88. The preferred thickness of support backer board system 10 is from about 250–375 mils. If a solid polyolefin or a solid alkenyl is used, the thickness of support backer board system 10 is generally from about 20–80 mils.

The layers of support backer board system 10 generally vary in their respective weight percent relative to each other. Support backer board system 10 generally comprises from about 50–100 wt. % of first layer 12. The remainder of support backer board system 10 (0–50 wt. %) comprises second layer 14, third layer 16, fourth layer 18, and any additional layers. Preferably, support backer board system 10 comprises from about 60–85 wt. % of first layer 12, and most preferably from about 65–75 wt. % of first layer 12. In general, first layer 12 is preferably increased on a percentage basis when the thickness of support backer board system 10 is increased because of economic considerations.

Methods For Forming A Support Backer Board System

A process that may be used in forming a support backer board system is described below. The process includes extruding at least a first layer and thermoforming the support backer board system into a desired shape in which the desired shape is generally contour to the selected siding.

According to one process, pellets of a polymeric resin(s), such as alkenyl aromatic polymers, polyolefins, polyethylene terephthalate (PET), polyesters, and combinations thereof in their solid form, are loaded into an extrusion hopper. The pellets of the polymeric resin(s) are to be used in forming at least the first layer of the support backer board system.

A nucleating agent (also referred to as "cell size control agent") or combination of such nucleating agents may be employed in the process for alvantages, such as their capability for regulating cell formation and morphology. The amount of nucleating agent to be added depends on the desired cell size, the selected blowing agent, and the density of the polymeric composition. Known nucleating agents, such as talc, mixtures of sodium bicarbonate and citric acid, and the like, may be employed in this process.

It is contemplated that stability control agent(s) may also be added to the polymeric resin(s), including conventional stability control agents. Some examples of stability control agents that may be used include, but are not limited to, glycerol monostearate, saturated higher fatty acid amides, and glycerol monoester of a $C_{20}$–$C_{24}$ fatty acid.

If desired, fillers, colorants, light and heat stabilizers, plasticizers, chemical blowing agents, flame retardants, foaming additives, and plastic compounding agents can be added to the polymeric composition. The polymeric composition comprises the polymeric resin and, if added, the nucleating agent, the stability control agent, and additives. The polymeric composition is conveyed through a feed zone of the extruder and heated at a temperature sufficient to form a polymeric melt.

A physical blowing agent is added at an injection port area of the extruder in an appropriate ratio to the target density. The selected blowing agent may be any type that is capable of producing foam with the selected resin. Some examples of blowing agents include physical blowing agents, such as halocarbons, hydrocarbons, or combinations thereof. Examples of these include commercially available hydrofluorocarbons (such as HFC-152a and HFC-134a), hydrochlorofluorocarbons (such as HCFC-22, HCFC-141b, and HCFC 142b) and the $C_3$–$C_6$ hydrocarbons. Other types of blowing agents include carbon dioxide. The polymeric composition and selected blowing agent are thoroughly mixed within the extruder in a mixing zoze, and subsequently cooled in a cooling zone. The cooled polymeric blowing agent melt is extruded through a die.

As shown in one process (see FIG. 6), the polymeric foam to be eventually used in forming first layer 12 is extruded from an extruder 30 through round die 32. After exiting round die 32, the extrudate expands when entering a lower pressure region (e.g., the atmosphere) and forms a polymeric web of foam. The polymeric web of foam is stretched over a sizing drum or mandrel 34 to size the web of foam.

The outer surfaces of polymeric web 36 are typically cooled so as to form a "skin." The skin is typically about a few thousand (or a few mils) thick, but may vary depending on the cooling employed. The skin provides additional strength and also a smoother surface, which is more aesthetically pleasing to a consumer. It is contemplated that the methods for cooling can include water and air. The skinning may be performed, for example, by stretching polymeric web 36 over sizing drum 34 with optional cooling, wherein an inner surface of polymeric web 36 is cooled.

A polymeric web 36 proceeds to travel around an S-wrap of rollers 38a–c in which roller 38a is an idler roller and rollers 38b and 38c are driven or pull rollers. polymeric web 36 will form first layer 12 of support backer board system 10. Driven rollers 38b, 38c assist in moving polymeric web 36 through this process. Polymeric web 36 proceeds through two idler rollers 40 a,b before proceeding between two driven rollers 42a,b. Driven rollers 42a,b assist in maintaining a consistent surface for which to add an optional second layer 14 via a coating or laminating machine 44. Coating machine 44 may be any conventional machine that is capable of applying an optional laminated surface coating to polymeric web 36. The laminated surface coating will eventually form second layer 14 of support backer board system 10. Coating machine 44 is also optional to this process. Polymeric web 36, including the optional laminated surface coating, continues proceeding through a plurality of idler rollers 46. It is contemplated that polymeric web 36 may be processed to include panting on a surface(s) or other treatments.

Polymeric web 36 proceeds through the opening between two driven nip or polish rollers 48a,b. At this opening, a second optional laminated surface coating is added to polymeric web 36 and the first optional laminated surface coating via a coating or laminating machine 50. Coating machine 50 may be any conventional machine that is capable of applying a second optional laminated surface coating. The second optional laminated surface coating will eventually form an outer layer, such as second layer 14 (see FIG. 2). At this point, the optional laminated surface coating (s) polymeric web 36 form a support backer board system.

The support backer board system proceeds to driven roller 52 and around a plurality of idler rollers 54. In a alternative embodiment, roller 52 is an idler roller that, along with the plurality of idler rollers 54, may be located generally parallel to roller 48b such that the laminated surface coating(s) and polymeric web 36 proceed in a generally horizontal direction after exiting between rollers 48a,b.

The support backer board system proceeds towards an optional perforating creasing machine 62. The optional perforating creasing machine 62 may include any conventional equipment that is capable of folding the support backer board system into a fanfold board system. Of course, if a sheet board system is desired, the creasing equipment should not be included in the process. A perforating machine, however, may be used to produce a sheet board system. The optional perforating creasing machine may be located after thermoformer 64.

Figure 6:
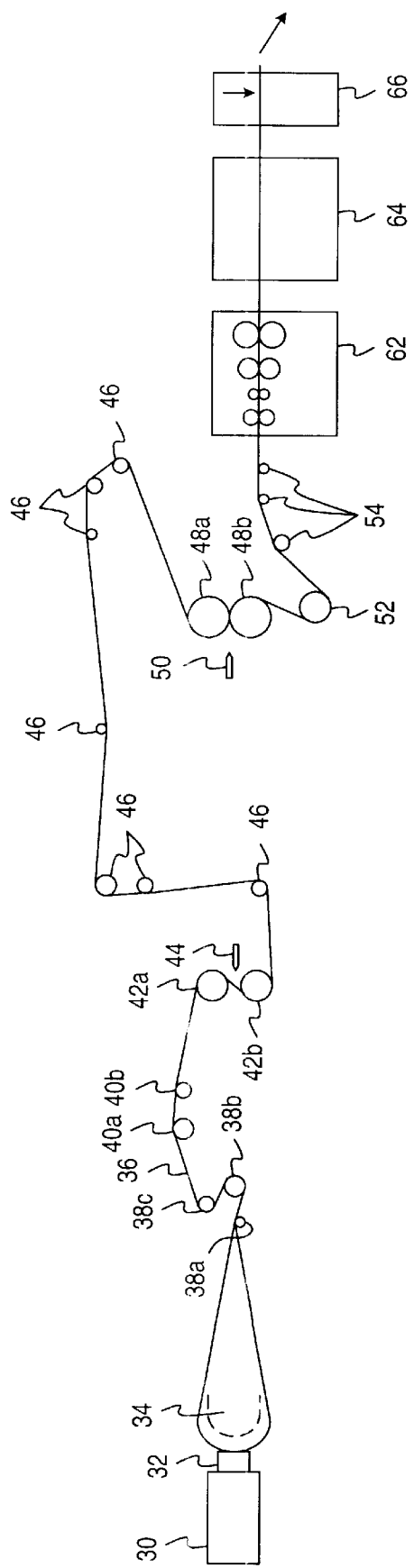
FIG. 6 is a schematic flow diagram of an overall sequence of operations according to one embodiment involved in the manufacture of a support backer board.
Figure 7A:
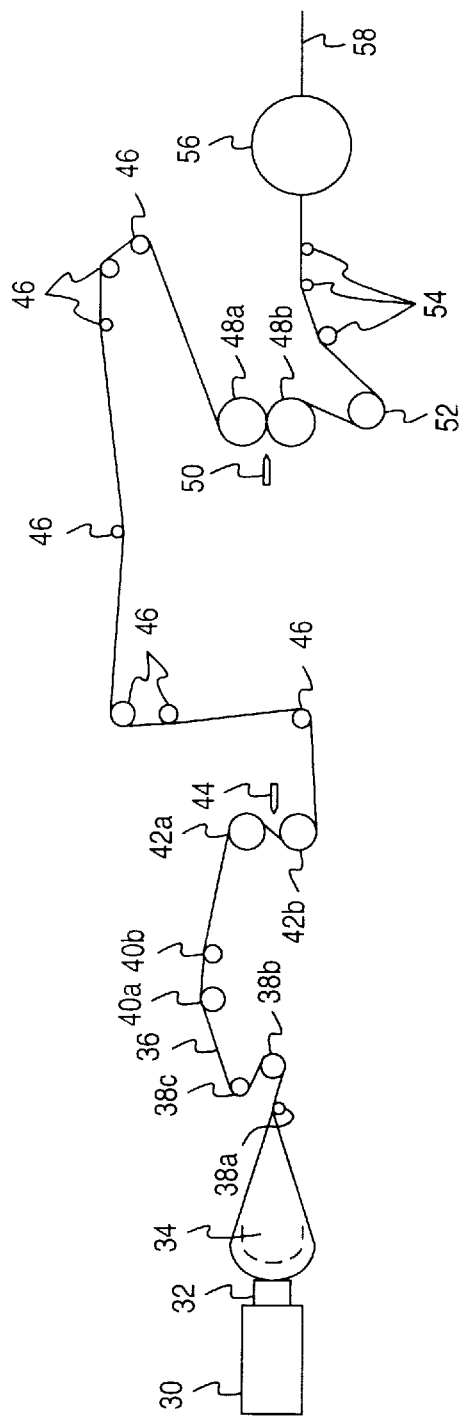
FIGS. 7a and 7b are schematic flow diagrams of an overall sequence of operations according to one embodiment involved in the manufacture of a support backer board.
Figure 7B:
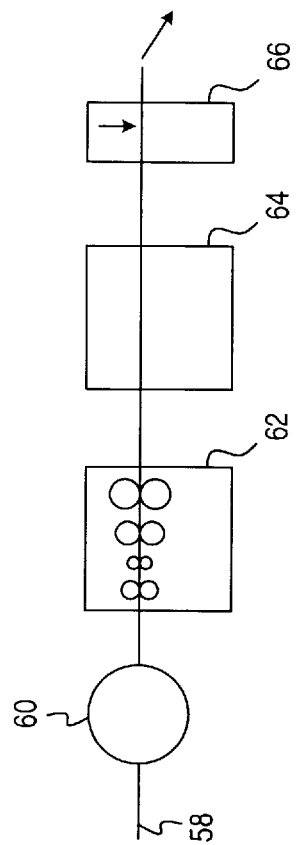

As shown in FIG. 6, the support backer board system proceeds towards thermoformer 64. The support backer board system is formed into a desired shape in thermoformer 64. The desired shape is generally contour to the selected siding. One example of thermoforming includes forming or shaping a polymeric web or sheet by heating the web near its softening point, fitting along the contours of a mold with pressure supplied by vacuum or other force, and removing it from the mold after cooling below its softening point. The thermoforming may be performed as an "inline" process or an "off-line" process. An "in-line" thermoforming process, as (used herein, is defined as a continuous process with the extrudate steps as shown in, for example, FIG. 6. The in-line thermoforming process may not need a heating oven or tunnel since the extrudate may already be at an appropriate temperature to be thermoformed. An "off-line" thermoforming process, as used herein, is defined as a on-continuous process with the extrudate steps, as shown in FIGS. 7a and 7b described below.

Referring to FIG. 6, according to one embodiment, thermoformer 64 includes a heated tunnel where the support backer board system is heated. The temperature of a heating tunnel will vary depending on the polymeric material. Generally, the heating tunnel will operate at a temperature from about 350–500° F. The heated support backer board system then continues into the mold and is formed or contoured therein to its desired shape by pressure from a vacuum. The molds used in thermoformer 64 may vary in size and shape. These different sizes and shapes generally correspond to the design of the siding. An "in-line" process may be run at a speed of about 140 ft/min., and generally runs at a speed of about 120 ft/min. The speed will vary on factors such as chain cycle time and the amount of mold closed time for cooling.

The support backer board system is then cut to a desired dimension by shearing equipment 66. Shearing equipment 66 may be any equipment capable of cutting the support backer board system into desired dimensions. It is also contemplated that other finishing operations may occur, such as packaging, folding and/or trimming.

It is contemplated that the perforation of the support backer board system may occur after thermoformer 64. The trimming and creasing of the support backer board system may occur in the mold.

Referring to the "off-line" process of FIGS. 7a and 7b, the process includes additional steps which,were not included in the process of FIG. 6. Referring to FIG. 7a, the process includes a roller or winder 56 which rolls the support backer board system. Referring to FIGS. 7a and 7b, rolled support backer board system 58 proceeds to an unwinder 60. Unwinder 60 unwinds rolled support backer board system 58. As shown in FIG. 7b, the unwound support backer board proceeds to optional perforating creasing machine 62, thermoformer 64, and shearing equipment 66. An "off-line" process may be run at a speed of about 140 ft/min., and generally runs at a speed of about 120 ft/min. An "off-line" process may operate at speeds lower than an "in-line" process depending on whether additional time is necessary for the support backer board system to reach an appropriate temperature.

Methods For Using Support Backer Board Systems

The support backer board systems are used with siding. Siding, as used herein, is defined as protective facing or cladding on a surface. In addition to protection, such as repelling water, siding has an aesthetic value. Siding is typically adapted to cover walls or other surfaces of a structure in both residential and commercial settings. The siding is typically vinyl, but may also include polymer-like materials and the like. It is contemplated that siding may be made of other materials in which additional support to the siding is desired. Common commercial types of siding include 4", 4.5", and 5" Doubles, and 4", 4.5", and 5" Double Dutch.

While the present invention has been described with reference to one or more particular embodiments, those skilled in the art will recognize that many changes may be made thereto without departing from the spirit and scope used in the present invention. Each of these embodiments and obvious variations thereof is contemplated as falling within the spirit and scope of the claimed invention, which is set forth in the following claims.

What is claimed is:

1. A method for using a support backer board system and siding, said support backer board system comprising at least a first layer, the method comprising the steps of:
   providing siding;
   extruding a first layer to form said board system, said first layer being made from a material selected from the group consisting of alkenyl aromatic polymers, polyolefins, polyethylene terephthalate, polyesters, and combinations thereof;
   thermoforming said board system into a desired shape, said desired shape being generally contour to said sliding, said board system being adapted unfold at hinges therein; and
   attaching said siding to said board system so as to provide support to said siding.

2. The method of claim 1, wherein said siding is made from vinyl or polymer materials.

3. The method of claim 1, wherein said thermoforming step is performed as an in-line process.

4. The method of claim 1, wherein said thermoforming step comprises placing the extrudated board system in a mold and forming the board system into the desired shape under pressure.

5. The method of claim 1, wherein said thermoforming step is performed as an off-line process.

6. The method of claim 5, wherein said thermoforming step comprises heating the extrudated board system, placing the heated extrudated board system in a mold, and forming the board system into the desired shape under pressure.

7. The method of claim 1, wherein the first layer is an alkenyl aromatic polymer.

8. The method of claim 7, wherein the alkenyl aromatic polymer is polystyrene.

9. The method of claim 1, wherein said board system further comprises a second layer, said second layer being made from a material selected from the group consisting of alkenyl aromatic polymers, polyolefins, polyethylene terephthalate, polyesters, and combinations thereof.

10. The method of claim 9, wherein said board system further comprises a third layer, said third layer being made from a material selected from the group consisting of alkenyl aromatic polymers, polyolefins, polyethylene terephthalate, polyesters, adhesives, and combinations thereof.

11. The method of claim 10, wherein said second and third layers are made of high impact polystyrene.

12. The method of claim 1, wherein said board system comprises a first layer, a second layer, a third layer, and a fourth layer, said first layer being comprised of a polystyrene, said second layer being comprised of a polystyrene or a polyolefin, said third layer being comprised of an adhesive, and said fourth layer being comprised of a polystyrene or a polyolefin.

13. The method of claim 1, wherein the step of attaching includes using nails, screws, staples, or a combination thereof.

14. The method of claim 1, wherein said board system has a thickness from about 125 to about 500 mils.

15. The method of claim 1, further comprising the steps of providing a material selected from plywood, orientated strand board, foamed sheathings, beadboard, hardboard, blackboard, fiberboard, and existing siding, and attaching said board system and said material.

16. A method for using a support backer board system and siding, said support backer board system comprising at least three layers, the method comprising the steps of:
   providing siding;
   extruding a first layer to form said board system, said first layer being made from at least one foamed alkenyl aromatic polymer;
   adding a second layer and a third layer to said first layer so as to form said board system, said second layer and third layers being film layers made from independently selected resin; said first layer being located in between the second layer and said third layer;
   thermoforming said board system into a desired shape, said desired shape being generally contour to said siding; and
   attaching said siding to said board system so as to provide support to said siding.

17. The method of claim 16, wherein said alkenyl aromatic polymer is polystyrene.

18. The method of claim 16, wherein said siding is made from vinyl or polymer materials.

19. The method of claim 16, wherein said thermoforming step comprises placing the extrudated board system in a mold and forming the board system into a desired shape under pressure.

20. The method of claim 16, wherein said board system is adapted to unfold at hinges therein.

21. The method of claim 16, wherein said second and third layers are made from materials selected from the group consisting of alkenyl aromatic polymers, polyolefins, polyethylene terephthalate, polyesters, adhesives, and combinations thereof.

22. The method of claim 21, wherein said second and third layers are made from high impact polystyrenes.

23. The method of claim 16, wherein said thermoforming step comprises placing the extrudated board system in a mold and forming the board system into a desired shape under pressure.

24. The method of claim 16, wherein said thermoforming step comprises heating the extrudated board system, placing the heated extrudated board system in a mold, and forming the board system into a desired shape under pressure.

25. The method of claim 16, wherein the step of attaching includes using nails, screws, staples, or a combination thereof.

26. The method of claim 16, wherein said board system has a thickness from about 125 to about 500 mils.

27. The method of claim 16, further comprising the steps of providing a material selected from plywood, orientated strand board, foamed sheathings, beadboard, hardboard, blackboard, fiberboard, and existing siding, and attaching said board system and said material.

28. The method of claim 16, wherein said board system is in the form of a sheet.

* * * * *